United States Patent [19]

Almond et al.

[11] Patent Number: 4,975,695
[45] Date of Patent: Dec. 4, 1990

[54] HIGH SPEED COMMUNICATION PROCESSING SYSTEM

[75] Inventors: Gary Almond, Germantown; Asghar Mostafa, Silver Spring; Fred S. Lee, Rockville, all of Md.

[73] Assignee: Data General Corporation, Westboro, Mass.

[21] Appl. No.: 103,611

[22] Filed: Oct. 1, 1987

[51] Int. Cl.$^5$ .............................................. H04Q 1/00
[52] U.S. Cl. ......................... 340/825.790; 370/60.100
[58] Field of Search ............... 340/825.79, 825.03, 340/825.04; 370/85, 94, 60, 64, 60.1, 85.1, 94.1

[56] References Cited

U.S. PATENT DOCUMENTS

| | | | |
|---|---|---|---|
| 4,058,672 | 11/1977 | Crager et al. | 370/60 |
| 4,491,944 | 1/1985 | Caizergues et al. | 370/110.1 |
| 4,608,685 | 8/1986 | Jain et al. | 370/94 |
| 4,649,534 | 3/1987 | Manjaries | 370/94 |
| 4,685,100 | 8/1987 | Coppens et al. | 370/58 |
| 4,710,952 | 12/1987 | Kobayashi | 370/58 |
| 4,720,854 | 1/1988 | Sand | 370/60 |

Primary Examiner—Donald J. Yusko
Assistant Examiner—Edwin C. Holloway, III
Attorney, Agent, or Firm—Robert Dulaney

[57] ABSTRACT

A communications node for handling circuit and packet switching and capable of expansion to include multiple switching matrices, multiple network processors and multiple packet processors is disclosed. Each switch matrix has multipile I/O ports and communications with user interfaces, network interfaces and other system components via bidirectional data links. At least one switch matrix is connected via a bidirectional data link to a packet processor and a network processor. All processors are interconnected via a computer bus. Switch matrices are connected to each other either by a backplane bus or via bidirectional data links.

4 Claims, 1 Drawing Sheet

HIGH SPEED COMMUNICATION PROCESSING SYSTEM

BACKGROUND OF THE INVENTION

1. Field of the Invention

The present application relates generally to communication processing systems and more particularly to an expandable communications node providing processing of integrated voice, data and fax.

2. Description of the Prior Art

Prior art communications switching systems typically consist of a plurality of communications processing nodes connected via telephone lines, local area networks or wideband span bands. The number of nodes and processing capacity of each node is usually based on the present and, to some degree, the anticipated near term growth in the number of mainframes, users, terminals, voice trunks and other devices supplying data to the nodes. Each node typically contains at least (a) one or more user interfaces for handling user input, output and reformatting, (b) one or more network interfaces to handle the input, output and reformatting of data from the network (c) a switch matrix to interconnect the appropriate user interface with the appropriate network interface, and (d) a processor for controlling the switch matrix connections and, in some systems, for handling packet processing and other overhead functions.

Prior art nodes commonly are not designed for and have little, if any, provision for incremental, modular increases in processing capacity to meet increasing user needs. Adding additional system functionality or enlarging the capacity of the system when a node can no longer meet user demands typically requires significant reconfiguration of the existing system or complete replacement of the existing nodes with nodes of larger capacity. Either of these approaches usually results in significant undesirable disruption in system services. Furthermore, the purchase and installation of nodes that have sufficient flexibility and reserve processing power to handle substantial future growth in demands on the system is generally not a practical solution, even if such nodes are available, because of the extra expense involved in purchasing excess capacity and the uncertainty of trying to accurately forecast demand in the future.

The present invention relates to a novel circuit for resolving the above and other prior art problems.

SUMMARY OF THE INVENTION

The present invention relates to apparatus for flexible, expandable high speed communications processing, including multiple switch matrices, multiple network processors and multiple packet processors.

It is a feature of the invention that the switch matrices are connected to all user interfaces, network interfaces, network processors and packet processors via bidirectional serial data links.

It is another feature of the invention that all processors are interconnected via a parallel computer bus.

It is an advantage of the invention that network processing capacity, packet processing capacity and switching capacity can be added with little disruption of system services to the users.

Other features and advantages of the present invention will be understood by those of ordinary skill in the art after referring to the detailed description of the preferred embodiment and drawings herein.

DESCRIPTION OF THE PREFERRED EMBODIMENT

Structure and Interconnection

Figure 1:
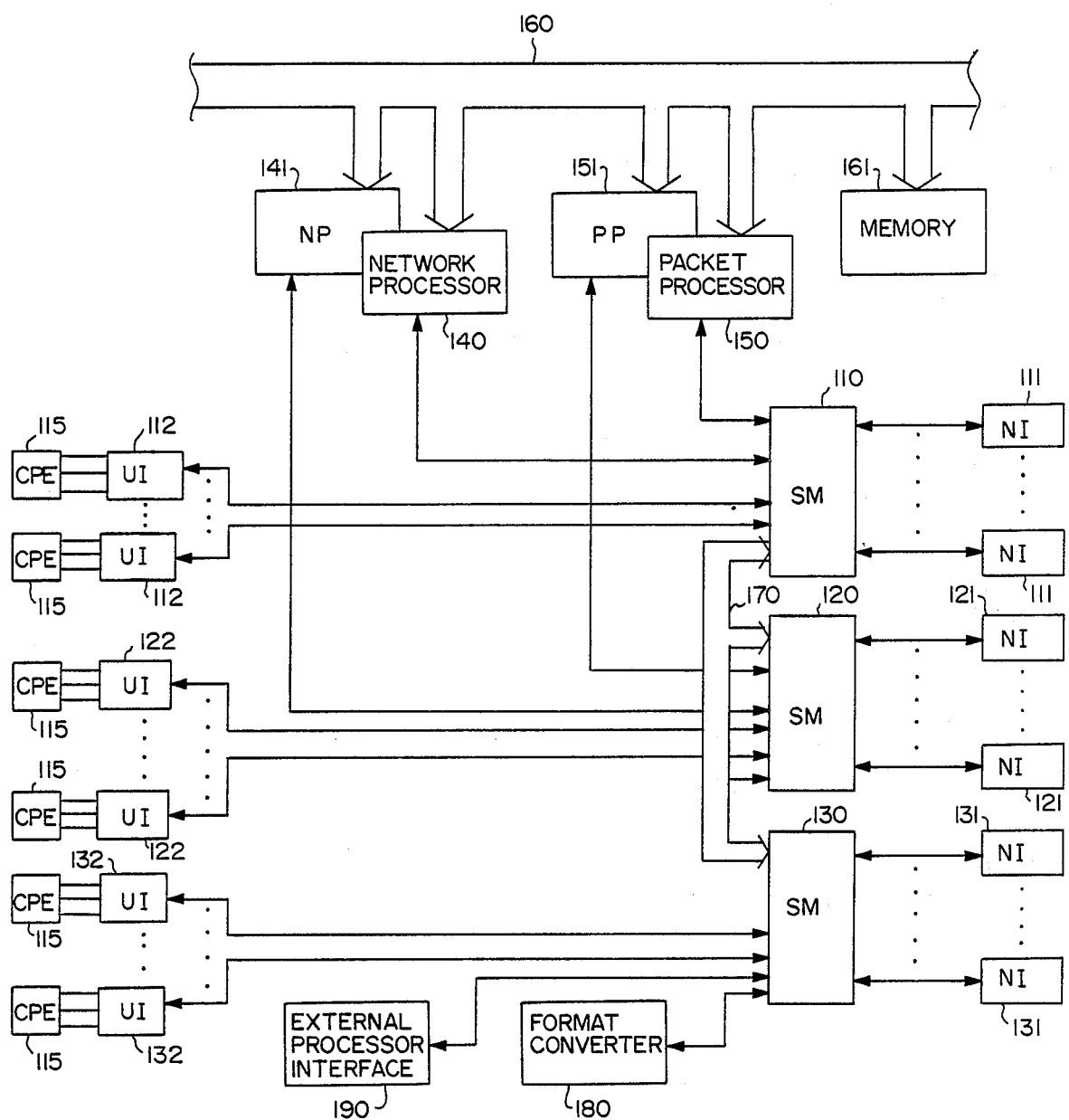
FIG. 1 is a block diagram of a communication processing node embodying the invention.

Looking at FIG. 1, a block diagram of a communications processing system according to the present invention is depicted. In this embodiment, three Switch Matrices 110, 120 and 130, for example wideband time-slot switches, are each connected via bidirectional serial links to a plurality of User Interfaces (UI) 112, 122 and 132 and a plurality of Network Interfaces (NI) 111, 121, 131. In addition, SM 110 is connected via a bidirectional serial link to Network Processor (NP) 140 and Packet Processor (PP) 150. SM 120 is connected via a similar data link to NP 141 and PP 151.

It should be understood that the disclosed system is highly flexible and modular and the depicted system was chosen for simplicity and clarity of presentation. It is but one example of many possible combinations of these components. A greater or lesser number of switch matrices, network processors, packet processors, user interfaces and network interfaces could have been chosen to depict the system. The specific design of an individual system depends on the particular data, voice and other requirements placed on the node. For example, a system handling a large amount of packet switching could require more packet processors, but fewer switch matrices. Similarly, a system handling a large amount of circuit switching traffic could require a larger number of switching matrices, but only one packet processor.

Since the three switch matrices and their interconnections are substantially identical, only SM 110 will be discussed in detail. SM 110, in a preferred embodiment, contains 16 I/O ports to accommodate up to 16 data links. Other numbers of I/O ports could have been chosen for the switch matrix. As discussed below, these 16 I/O ports may be individually connected to a user equipment interface, a network equipment interface, a packet processor, a network processor, another switch matrix or, if appropriate to the system, a special purpose format convertor (180) or an interface to an external processor (190). In this embodiment, all data links operate at 2.048 mbps. It will be understood by those of ordinary skill in the art that different data rates could have been used.

User Interfaces 112 contain the logic to receive voice, data and fax information from various Customer Provided Equipment (CPE) 115 and perform the necessary formatting, multiplexing, buffering and switching functions to provide the user data to SM 110. Each UI 112 also contains the logic to receive data from SM 110 and perform the necessary formatting, demultiplexing, buffering and switching functions to provide the data to the appropriate user I/O device.

Each NI 111, for example a T1 interface, contains the logic to receive data from SM 110 and perform the necessary formatting, demultiplexing, buffering and switching to provide the data to the appropriate network (not shown). Each NI 111 also contains the logic to receive data from the network and perform the necessary formatting, multiplexing, buffering and switching functions to provide data from the network to SM 110. SM 120 and 130 are similarly connected to User Interfaces 113 and 114 respectively and to Network Interfaces 121 and 131 respectively.

In the disclosed embodiment, close physical proximity of the switch matrices allows for the use of a high bandwidth backplane bus 170 to handle communications among switch matrices. This eliminates the need for dedicating a portion of the switch matrix I/O ports to communication among switch matrices and frees the ports for user traffic. The use of a high bandwidth bus also has the advantage of providing sufficient bandwidth to allow additional switch matrices, and therefore, additional user and network interfaces, to be incorporated into the system. If desirable in a particular system, however, communications among switch matrices could be handled via data links.

The Network processor provides the appropriate commands and information to establish and terminate the appropriate Switch Matrix connections to accomplish the requested information transfer. The Packet Processor operates as a "level 2" protocol translation processor and is responsible for creating formatting and controlling the transfer of information according to the desired protocol standard. As discussed above, the switch matrices are connected via data links to the Network Processors and the Packet Processors.

To provide overall coordination of the interconnection of the system components, one of the network processors must function as a "master". This requires that the master must be informed of, and retain a record of, all switching connections established not only by itself, but also by the other network processors. As can be seen from FIG. 1, each of the network and packet processors needs to be directly connected via a data link to only one of the switch matrices. NP 140, in this embodiment, is connected via data link only to SM 110. Switching commands or other information from NP 140 to one of the other switch matrices is passed through SM 110 via bus 170 to SM 120 or SM 130.

In addition to being connected to the switch matrices by data links, each network and packet processor can communicate with each other processor via a standard parallel processor bus 160. Memory 161, for example a hard disk, and other processing resources may be attached to bus 160 and accessed by the processors over bus 160.

Operation

The general operational requirements internal to each of the various blocks depicted in FIG. 1 is well known in the art. The discussion below will be directed to the particular operations arising from the interconnection of components in a novel and synergistic manner to create a new and useful high speed communications processor.

One of the functions of the master network processor is to configure the system to be ready to receive and process data transfers from any user interface or network interface in the system. To accomplish this the master network processor establishes a connection, through one of the switch matrices, between each UI 115 and one of the packet processors. Similarly, a switch matrix connection between each NI 111 and one of the packet processors is established. These connections provide an established data path for each interface to pass the initial transfer of transaction set-up information from the interface to a packet processor. Furthermore, in the event of hardware failures, heavy workload on a portion of the system or other problems, the master can reconfigure the system by changing the interface-to-packet processor connections to eliminate or reduce the use of a particular processor, switch matrix or interface.

In operation, whenever a user interface or a network interface wishes to initiate a data transfer, it sends a transmission containing information about the type of transmission requested and the target interface. This transmission is passed via the pre-established data path through the switch matrix to the appropriate packet processor currently assigned to that user interface. This information is then passed from the receiving packet processor to the appropriate network processor and is used to set up the appropriate connection through the switch matrix to handle the actual data transfer.

As discussed, each User Interface and Network Interface is connected to a single Switch Matrix. Therefore, if the sending and receiving interface are connected to the same switch matrix, only that switch matrix is involved in passing data. If, however, the receiving CPE or network is connected to a different switch matrix than the sending CPE or network, the data transfer will involve multiple switch matrices. Also, certain types of transactions, such as voice and circuit switching data, must be handled in a different manner than packet transactions. Once the data transfer is initiated, if the data transfer is of the circuit switching type, the data being transferred passes from the sending interface through the switch matrix or matrices to the receiving interface Once the connection through the switch matrix or matrices is established, the packet processor is no longer involved in the switching type transfer process and the same switch matrix connection is maintained throughout the transfer. By contrast, in a packet switching type of transfer, the packet processor receives, processes and returns each packet and, therefore, is involved throughout the data transfer process. The packet processor may send individual packets over different data paths during the course of a data transfer.

As an example, a circuit switching type data transmission initiated from a piece of Customer Provided Equipment 115 connected to a UI 112 and intended for a network connected to one of the Network Interfaces 111 will be discussed. The UI 112 connected to the transmitting CPE 115 would receive, format and prepare the data for transmission. In this embodiment, as discussed above, whenever a UI 115 has data to transmit, it first sends a message identifying the type of transmission requested and the target Network Interface. This transmission passes through the switch matrix and is forwarded to the appropriate packet processor currently assigned by the master to receive such messages from that UI 115. When the message is received, the packet processor passes the target information to the appropriate network processor, as currently assigned by the master processor. The receiving network processor processes the information and sends the necessary commands over the data link to the switch matrix to cause the connection to be established to allow the data transfer to the appropriate NI 111. The network processor also notifies the packet processor that a connection is made. The packet processor then sends a transmission back to the UI 115, via SM 110, instructing the UI 115 to initiate the desired transmission.

If the transmission from the UI 112 is intended for an interface attached to a different Switch Matrix than the sending interface (e.g. NI 131), SM 110 will be instructed to pass the incoming data from the UI 112 data link onto the backplane bus 170. SM 130 will similarly be instructed to retrieve the data from backplane bus 170 and send it to the appropriate NI 131 interface.

In regard to packet processing, packet data received by a Switch Matrix is forwarded to the appropriate Packet Processor. After processing, the Packet Processor forwards the packet via data link to the Switch Matrix which will handle the transmission to the appropriate interface. If the Packet Processor which received the packet does not have a direct data link connection with the appropriate Switch Matrix, the packet may be forwarded either (a) over processor bus 160 to another Packet Processor which can forward the packet to the appropriate Switch Matrix or (b) over the data link to the switch matrix to which the receiving packet processor is connected and then over backplane bus 170 to the appropriate switch matrix. In both packet and switching types of transfers, the network processor performs overhead and interconnection processing.

The invention may be embodied in yet other specific forms without departing from the spirit or essential characteristics thereof. For example, if the traffic on bus 160 reaches the available bus bandwidth, additional processors could still be incorporated into the node by adding another processor bus, such that some of the processors would be connected to the first processor bus and some connected to the added bus.

In addition, if all CPE 115 and UI 112 equipment was eliminated the apparatus would function as a digital cross-connect system. Such a system could be employed to receive data transmissions from a network interface, separate the transmission into individual data channels and rearrange and/or retransmit all or part of the data.

The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

We claim:

1. A communication processing system comprising:
a processor bus;
a plurality of network processors, each network processor connected to the processor bus;
a plurality of packet processors, each packet processor connected to the processor bus;
a plurality of switch matrices;
a plurality of network interfaces;
a plurality of interfaces to user input/output devices; and
bidirectional bus means including
means for connecting each switch matrix to each other switch matrix,
means for connecting each packet processor to a switch matrix,
means for connecting each network processor to a switch matrix,
means for connecting each switch matrix to a portion of the user interfaces and
means for connecting each switch matrix to a portion of the network interfaces.

2. A communication processing system comprising:
a processor bus;
a network processor connected to the processor bus;
a packet processor connected to the processor bus;
a plurality of switch matrices;
a plurality of network interfaces for receiving data from and providing data to the switch matrices,
a plurality of user interfaces for receiving data from and providing data to the switch matrices, and
bidirectional bus means including
means for connecting each switch matrix to the network processor,
means for connecting each switch matrix to the packet processor,
means for connecting each of the switch matrix to a portion of the network interfaces and
means for connecting each of the switch matrices to a portion of the user interfaces.

3. A communication processing system comprising:
processor bus means;
a plurality of network processors, each network processor connected to the processor bus;
a plurality of packet processors, each packet processor connected to the processor bus;
a switch matrix;
a network interface;
a user interface;
bidirectional bus means including
means for connecting the switch matrix to each network processor,
means for connecting the switch matrix to each packet processor,
means for connecting the switch matrix to the network interface and
means for connecting the switch matrix to the user interface.

4. A digital cross-connect system comprising:
a processor bus;
a plurality of network processors, each network processor connected to the processor bus;
a plurality of packet processors, each packet processor connected to the processor bus;
a plurality of switch matrices;
a plurality of network interfaces; and
bidirectional bus means including
means for connecting each switch matrix to each other switch matrix,
means for connecting each packet processor to a switch matrix,
means for connecting each network processor to a switch matrix, and
means for connecting each switch matrix to a portion of the network interfaces.

* * * * *